Aug. 9, 1927.
V. CANO
APPARATUS FOR HEATING, COOLING, OR DRYING MATERIALS
Re. 16,699
2 Sheets-Sheet 1
Original Filed Sept. 10, 1925
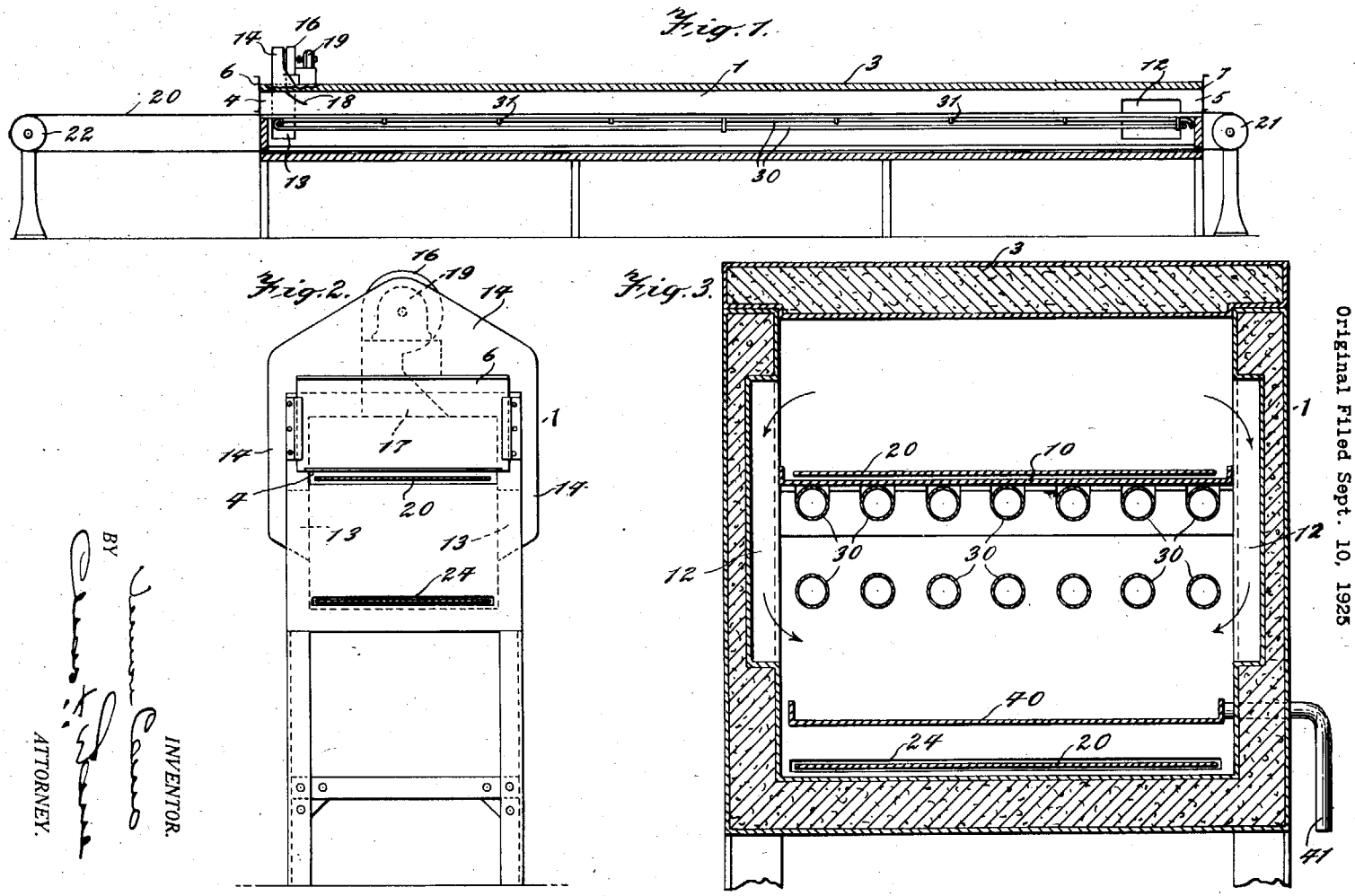
INVENTOR.
Vincent Cano
BY
Chas. H. Howe
ATTORNEY.

Aug. 9, 1927.
V. CANO
APPARATUS FOR HEATING, COOLING, OR DRYING MATERIALS
Re. 16,699
2 Sheets-Sheet 2
Original Filed Sept. 10, 1925
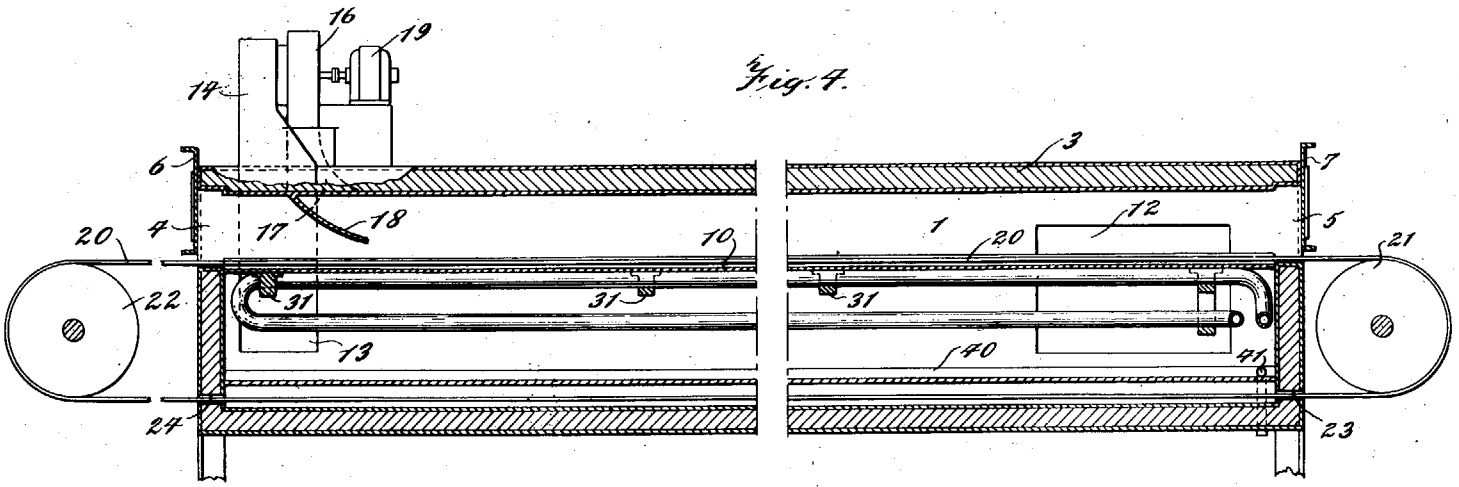
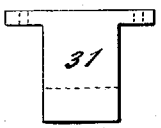
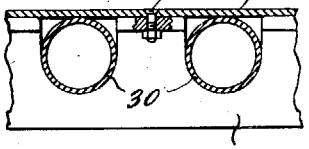
INVENTOR.
BY
ATTORNEY.

Reissued Aug. 9, 1927. Re. 16,699

UNITED STATES PATENT OFFICE.

VERNON CANO, OF ELIZABETH, NEW JERSEY.

APPARATUS FOR HEATING, COOLING, OR DRYING MATERIALS.

Original No. 1,592,078, dated July 13, 1926, Serial No. 55,432, filed September 10, 1925. Application for reissue filed October 28, 1926. Serial No. 144,884.

The invention relates to an apparatus for heating, cooling or drying materials and has for its object to provide a relatively simple and efficient device comprising a tunnel enclosed continuous conveyor, the upper reach of which conveyor operates in an upper compartment of the tunnel, in contact with a dividing partition, and the lower reach of said conveyor passes through the lower compartment of the tunnel in which is contained a series of pipes which maintain a circulation of heating or cooling medium in proximity to the under side of the partition, a continuous circulation of air being maintained through the tunnel by means of a blower located near the entrance of the tunnel, said blower forcing the air through the upper compartment in the same direction as the travel of the belt, and drawing the air through the lower compartment over the heating or cooling pipe system.

The invention is illustrated in the accompanying drawings, in which:

Fig. 1 is a vertical longitudinal section through the apparatus.

Fig. 2 is an end elevation.

Fig. 3 is an enlarged cross sectional elevation.

Fig. 4 is an enlarged view similar to that shown in Fig. 1.

Fig. 5 is a detail of the mode of securing the pipes to the partition.

Fig. 6 is an end view of one of the pipe supporting brackets.

Referring to the drawings, 1 indicates the elongated box-like casing of the apparatus, which is supported on suitable legs and is preferably constructed of wood, metal or the like, with the walls thoroughly insulated the open top of the structure being closed by a removable cover 3, which is also insulated, as indicated in Fig. 3. The end walls of the casing are provided with openings 4 and 5, respectively, adapted to be partially closed by sliding doors or dampers 6 and 7. Dividing the elongated casing or tunnel longitudinally into upper and lower compartments is a horizontal partition 10, preferably of metal, which is secured to the inner walls of the tunnel in any appropriate manner. The opening 4 constitutes the inlet or entrance to the tunnel and similarly the entrance 5 forms the exit or discharge. It is desired to maintain a continuous circulation of air through the tunnel, the air current flowing from the entrance end of the upper compartment toward the exit, thence into the lower compartment, whence it is again delivered into the upper compartment and, to effect this, the upper and lower compartments are connected near the exit end of the tunnel by one or more ducts 12 formed in the side walls, and the lower compartment, near the entrance end of the tunnel, is provided with one or more lateral openings 13, which communicate with a hood 14, which is connected to the intake of a blower 16 mounted on the top of the tunnel and driven by a suitable motor 19, the exhaust duct of the blower communicating with an opening 17 in the top 3, said opening being provided with a deflector 18, which directs the air from the blower longitudinally of the upper compartment of the tunnel.

The endless conveyor belt 20 of fabric, or other suitable material, passes through the tunnel over a driving pulley 21, beyond the discharge end of the tunnel and an idler pully 22 adjacent the entrance end of the tunnel, so that the upper reach of the belt travels in contact with the partition 10 and the lower reach of the belt passes through openings 23 and 24 in the end walls near the bottom of the tunnel.

Secured to the lower face of the partition 10, by suitable brackets or hangers 31, is a continuous series of pipes 30 adapted to receive and have circulated therein an appropriate cooling or heating medium as the case may be, the ends of the pipes extending through a side wall of the tunnel. Preferably, a drip pan 40 is mounted in the casing below the pipes 30 and above the lower reach of the belt 20 to receive any moisture that is condensed within the lower compartment and discharge the same by waste pipe 41.

As indicated, the apparatus is designed primarily for the purpose of heating, cooling or drying articles carried on the conveyor belt 20 and, to effect this object, the articles are delivered to the upper reach of the belt extending beyond the entrance of the tunnel and are carried into the tunnel through the opening 4, the damper 6 being elevated sufficiently to permit the entrance of the articles. As the articles are carried through the tunnel by the upper reach of the belt, they are subjected to a current of air forced into the upper compartment of the tunnel by the blower 16 and traveling in the same direction as the upper reach of the belt, the air current then passing through the lateral ducts 12 to the lower compartment of the tunnel, where said air current comes in contact with the pipes 30 containing the circulating heating or cooling medium, whence the air passes through lateral openings 13 in the lower compartment into the hood 14 to the blower. The air, therefore, is maintained in continuous circulation through the tunnel at a proper temperature to effect the heating, cooling or drying of the articles carried by the upper reach of the conveyor. In addition to the effect produced by the circulating air current, the articles are subjected to the effect of the heating or cooling medium in the pipe system 30, as the latter is in close proximity to the plate or partition 10, over which the upper reach of the belt passes and which will effect the desired heat exchange to either cool or heat the articles carried by the belt, by direct conduction. The articles carried by the conveyor pass through the exit opening 5 of the tunnel, which is partially closed by the damper 7, the latter being elevated just sufficiently to permit the free passage of the belt and the articles contained thereon and to prevent the escape of any material portion of the air circulated through the tunnel by the blower.

As stated, the apparatus is designed for the purpose of heating, cooling or drying various articles, as, for example, the drying of glue, shellac, and similar products, by the application of heat, in which case steam or hot water will be circulated through the pipe system 30; or the drying of chocolate coated confections, or similar products, in which case the pipe system will be supplied with a circulating cooling medium, such as brine, ammonia, carbon dioxide, or other cooling or refrigerating medium.

What I claim is:

1. A heat exchange apparatus comprising an elongated tunnel having a longitudinal horizontal partition dividing the same into upper and lower compartments, a conveyor traversing said tunnel to carry articles to be subjected to the effect of heat exchange, pipes secured to the under side of said partition to circulate a heat exchange medium, a blower near the entrance of said tunnel having its intake connected to the lower compartment and its outlet connected with the upper compartment, and communicating means between the upper and lower compartments near the exit end of said tunnel; whereby air is continuously circulated through the tunnel in the direction of travel of the belt in the upper compartment and over the pipes in the lower compartment.

2. Cooling apparatus comprising an elongated tunnel having a longitudinal horizontal partition dividing the same into upper and lower compartments, a continuous conveyor, the upper reach of which traverses the upper compartment in contact with said partition and its lower reach passing through the lower compartment, cooling pipes secured to the under face of said partition, a blower near the entrance of said tunnel having its intake connected to the lower compartment and its outlet connected with the upper compartment, and communicating means between the upper and lower compartments near the exit end of said tunnel; whereby air is continuously circulated through the tunnel in the direction of travel of the belt in the upper compartment and over the pipes in the lower compartment.

3. A heat exchange apparatus comprising an elongated tunnel having a longitudinal horizontal partition dividing the same into upper and lower compartments, a conveyor traversing said tunnel immediately adjacent one side of said partition to carry articles to be subjected to the effect of heat exchange, pipes also supported immediately adjacent to the other side of said partition to circulate a heat exchange medium, a blower having its intake and outlet connected to the two compartments, and communicating means between the upper and lower compartments remotely situated from the blower connections; whereby air is continuously circulated through the two compartments.

4. A heat exchange apparatus comprising an elongated tunnel having a longitudinal horizontal partition dividing the same into upper and lower compartments, a conveyor traversing said tunnel immediately adjacent one side of said partition to carry articles to be subjected to the effect of heat exchange, pipes also supported immediately adjacent to the other side of said partition to circulate a heat exchange medium, a blower having its intake connected to the lower compartment and its outlet connected to the upper compartment near one end of said tunnel, and communicating means between the upper and lower compartments near the other end of said tunnel; whereby air is continuously circulated through the two compartments and around the pipes in the lower compartment.

VERNON CANO.